United States Patent
Zhang et al.

(10) Patent No.: US 11,431,802 B2
(45) Date of Patent: Aug. 30, 2022

(54) METHOD FOR DATA PROCESSING, SYSTEM AND COMPUTER READABLE STORAGE MEDIUM

(71) Applicant: Shenzhen Fugui Precision Ind. Co., Ltd., Shenzhen (CN)

(72) Inventors: Liu-Qing Zhang, Shenzhen (CN); Fang-Hua Xia, Shenzhen (CN); Yuan-Bo Zhu, Shenzhen (CN); Cheng Li, Shenzhen (CN); Hong Zou, Shenzhen (CN)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 66 days.

(21) Appl. No.: 17/021,239

(22) Filed: Sep. 15, 2020

(65) Prior Publication Data
US 2022/0037040 A1    Feb. 3, 2022

(30) Foreign Application Priority Data
Jul. 31, 2020  (CN) .......................... 202010762504.2

(51) Int. Cl.
| | | |
|---|---|---|
| *H04L 67/12* | (2022.01) | |
| *H04L 41/06* | (2022.01) | |
| *G16Y 40/20* | (2020.01) | |
| *G16Y 40/10* | (2020.01) | |
| *H04L 67/00* | (2022.01) | |
| *G16Y 40/40* | (2020.01) | |
| *G06Q 10/06* | (2012.01) | |
| *G16Y 40/35* | (2020.01) | |
| *H04L 67/565* | (2022.01) | |

(52) U.S. Cl.
CPC ....... *H04L 67/12* (2013.01); *G06Q 10/06375* (2013.01); *G16Y 40/10* (2020.01); *G16Y 40/20* (2020.01); *G16Y 40/35* (2020.01); *G16Y 40/40* (2020.01); *H04L 41/06* (2013.01); *H04L 67/2823* (2013.01); *H04L 67/34* (2013.01)

(58) Field of Classification Search
CPC ..... H04L 67/12; H04L 41/06; H04L 67/2823; H04L 67/34; G16Y 40/10; G16Y 40/20; G16Y 40/35; G16Y 40/40
See application file for complete search history.

(56) References Cited

U.S. PATENT DOCUMENTS

| | | | |
|---|---|---|---|
| 2016/0328719 A1 | 11/2016 | Ananchaperumal et al. | |
| 2019/0213152 A1* | 7/2019 | Jacobs | G06F 1/08 |
| 2019/0281132 A1* | 9/2019 | Sethuraman | H04W 12/10 |
| 2019/0387408 A1* | 12/2019 | Yang | H04W 24/08 |
| 2021/0034048 A1* | 2/2021 | Hajizadeh | G06N 20/00 |

FOREIGN PATENT DOCUMENTS

CN          108366051 A        8/2018

* cited by examiner

*Primary Examiner* — Jason D Recek
(74) *Attorney, Agent, or Firm* — ScienBiziP, P.C.

(57) ABSTRACT

In a method of data processing executed in a gateway, a communication protocol matched with a target device is selected from a device driver database of the gateway; a connection with the target device is established according to the matched communication protocol; a sensing data of the target device is acquired; a data cleaning processing is performed on the acquired sensing data; and the processed data is shared to a third-party platform.

17 Claims, 3 Drawing Sheets

METHOD FOR DATA PROCESSING, SYSTEM AND COMPUTER READABLE STORAGE MEDIUM

CROSS-REFERENCE TO RELATED APPLICATIONS

This application claims priority to Chinese Patent Application No. 202010762504.2 filed on Jul. 31, 2020, the contents of which are incorporated by reference herein.

FIELD

The subject matter herein generally relates to industrial control technology.

BACKGROUND

With an introduction of Industry 4.0, the application of the Industrial Internet is more extensive. In the field of industrial control, there are often different fields and different types of industrial devices, and different fields and different kinds of industrial devices use different communication protocols, and no agreement can be reached. In the prior art, a single gateway cannot collect the sensing data of multiple fields and multiple kinds of devices, which leads to poor compatibility. Enterprises need to develop customized communication programs when building IoT systems, which increases costs. In addition, because there is no unified data format for devices between different manufacturers and protocols, data between different periods, different systems, and different companies are poor sharing, reducing the utilization of the sensing data.

BRIEF DESCRIPTION OF THE DRAWINGS

Implementations of the present technology will now be described, by way of example only, with reference to the attached figures, wherein.

DETAILED DESCRIPTION

Figure 1:
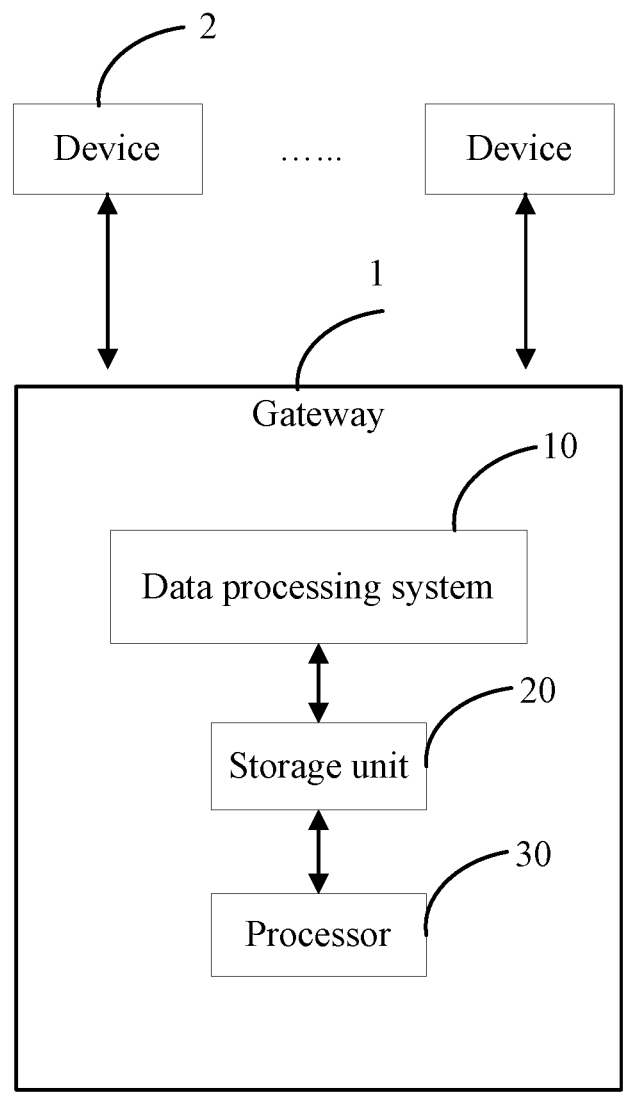
FIG. 1 is a diagram of an operating environment of a gateway according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as Java, C, or assembly. One or more software instructions in the modules may be embedded in firmware, such as in an erasable programmable read-only memory (EPROM). The modules described herein may be implemented as either software and/or computing modules and may be stored in any type of non-transitory computer-readable medium or another storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Referring to FIG. 1, FIG. 1 is a diagram of an operating environment of a gateway 1 according to an embodiment of the present disclosure. The gateway 1 also includes a data processing system 10, a storage unit 20, and a processor 30. The gateway 1 establishes a connection with multiple devices 2 according to a communication protocol and collects the sensing data of the devices 2. In the embodiment, the device 2 includes multiple fields and kinds, including but not limited to sensor devices (such as temperature controller, liquid level sensor, temperature sensor, humidity sensor, and so on), automation devices (such as mechanical arm and so on), SMT devices (such as chip mounter, printing machine, AOI optical inspection machine, reflow soldering, Multi-function mounter, solder paste inspection machine and so on), instrumentation devices (such as electric meter, barometer, temperature and humidity accounting and so on).

Wherein, the storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk and so on. The processor 40 may be a central processing unit (CPU), a controller, a microcontroller, a microprocessor, or other data processing chips.

Figure 2:
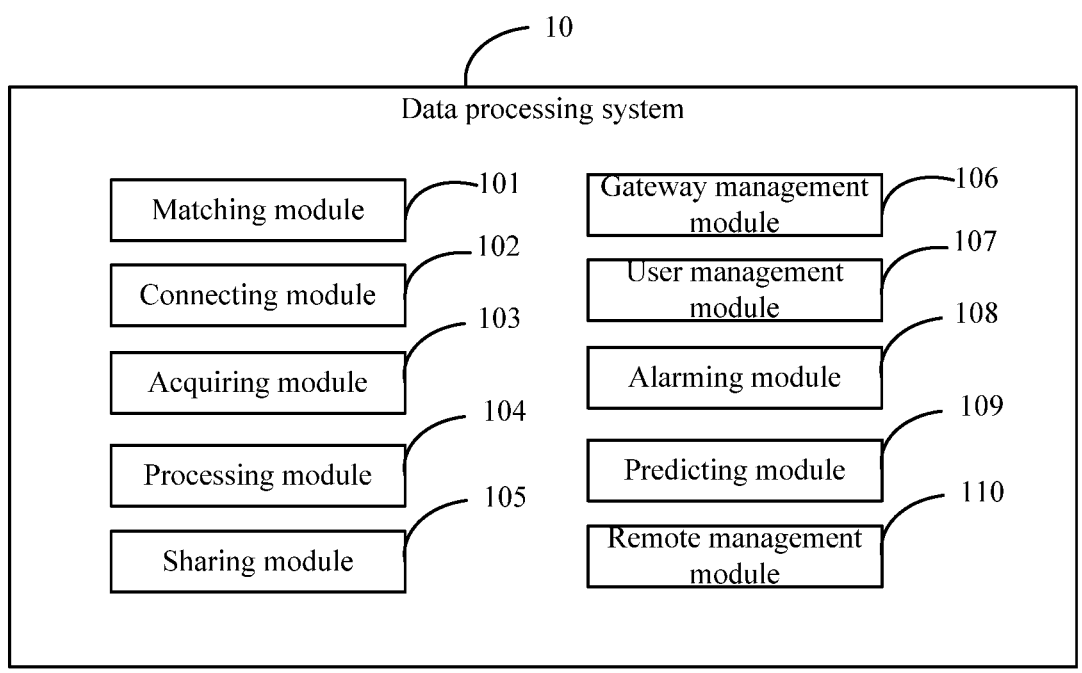
FIG. 2 is a block diagram of an exemplary embodiment of functional modules of a data processing system.

Referring to FIG. 2, FIG. 2 illustrates a block diagram of an exemplary embodiment of functional modules of a data processing system 10.

The data processing system 10 includes a matching module 101, a connecting module 102, an acquiring module 103, a processing module 104, a sharing module 105, a gateway management module 106, a user management module 107, an alarming module 108, a predicting module 109 and a remote management module 110. The modules are configured to be executed by one or more processors (in the embodiment, one processor 30) to complete the present invention. The module referred to in the present invention is a computer program segment that performs a specific instruction. The storage unit 20 is used to store program code and other data of the data processing system 10. The processor 30 is used to execute the program code stored in the storage unit 20.

The matching module 101 selects a communication protocol matched with a target device from a device driver database of the gateway 1.

In the embodiment, when an industrial device establishes a connection with the gateway, different communication protocols are used according to different device kinds, for example, Modbus communication protocol, serial communication protocol, TCP/IP protocol, MQTT protocol, and so on. The gateway 1 also includes the device driver database (not shown in the figures). The device driver database of the gateway 1 stores multiple fields and communication protocols that may be used by multiple kinds of devices. When the target device needs to establish a connection, the matching module 101 selects the communication protocol matched with the target device from the device driver database of the gateway 1.

The connecting module 102 establishes a connection with the target device according to the matched communication protocol.

In the embodiment, the connecting module 102 establishes the connection with the target device according to the communication protocol matched by the matching module 101.

In a preferred embodiment, all devices connected to the gateway 1 are called sub-devices, and the connecting module 102 also displays all sub-devices and sub-device information of the gateway 1 in the form of a list. When the target device is not in the sub-device list, the connecting module 102 also adds a new sub-device in the sub-device list. In addition, according to an actual requirement, the connecting module 102 deletes sub-devices in the sub-device list or modifies the sub-device information.

The acquiring module 103 acquires a sensing data of the target device after establishing the connection with the target device.

Specifically, the device driver database provides the gateway 1 with a device template for extracting the sensing data of the target device. Through the device template of the device driver database, the gateway 1 obtains the type of the sensing data of the target device.

In the process of acquires the sensing data of the target device, the acquiring module 103 searches for the device template corresponding to the target device in the device driver database, then invokes the device template corresponding to the target device to acquire the finally sensing data of the target device.

The acquiring module 103 further performs a feature extraction on the sensing data of the target device when the device template corresponding to the target device does not exist in the device driver database of the gateway 1, adds the device template corresponding to the target device according to a pre-defined business requirement and the extracted features and stores the device template in the device driver database of the gateway 1. Business requirements are pre-defined by developers or managers based on actual production or life requirements.

Furthermore the acquiring module 103 also modifies or deletes the device template corresponding to the target device when the business requirements change.

For example, the device driver database of the gateway 1 stores the templates for the existing industrial devices to acquire the sensing data. For example, an electric meter needs to collect data such as current and voltage, and an SMT device needs to collect the component model, missing part information, and the position of each component on the PCB board, and so on. When the data of the SMT device is required to be collected, the device template of the SMT device in the device driver database stored in the gateway is called to invoke the component model, missing part information, and the location of each component on the PCB board.

When a new industrial device is connected, such as a temperature and humidity sensor, and the device template of the temperature and humidity sensor does not exist in the device driver database of the gateway, and the acquiring module 103 performs feature extraction on the data of the temperature and humidity sensor, for example, temperature, humidity, time and other information. When only the temperature and humidity information are required to be collected in the business requirement information, the acquiring module 103 adds a template for the temperature and humidity sensor based on the business requirement and the extracted feature data, and stores the template in the device driver database, so that when the sensing data of the temperature and humidity sensor needed is required to be collected next time, the acquiring module 103 can directly invoke the corresponding device template.

In addition, when the business requirements change, for example, in addition to temperature and humidity, it is necessary to obtain the temperature and humidity acquiring time of the temperature and humidity sensor, therefore the acquiring module 103 also needs to modify the device template corresponding to the temperature and humidity sensor according to the changed requirements, and use the changed template to replace the old template. When the data of the temperature and humidity sensor is not required to be collected, in order to save storage space, the acquiring module 103 also deletes the device template corresponding to the temperature and humidity sensor.

The processing module 104 performs a data cleaning processing on the acquired sensing data.

The processing module 104 obtains a data forwarding requirement of the third-party platform, and cleans the original sensing data obtained from the industrial device as needed, and converts the original sensing data into data that can be recognized by the third-party platform. As an example, the voltage obtained from the electric meter is binary data. When required to be forwarded to a server, a cloud platform or a monitoring platform, the binary data is converted into hexadecimal data through data cleaning. Of course, the cleaning method for different data is not limited to this and will not be repeated in the embodiment.

The sharing module 105 shares the processed data to a third-party platform.

Further, the data processing system 10 further includes:

The gateway management module 106 configures a network address, a system parameter, and a kernel parameter of the gateway.

Specifically, the system parameter includes basic information such as the model, location, and the number of access devices of the gateway, and the kernel parameter includes system information such as memory and network hard drives. The gateway management module 106 is also used to restart the gateway and restore factory settings.

The user management module 107 manages a user account, assigns a user operation permission, and configures an administrator responsible for dealing with an abnormal event.

Wherein, managing the user account management includes creating users, deleting users, and so on.

The alarming module 108 records and analyzes log events during operation of the gateway, and when the abnormal event occurs in the log events, starts an alarm program and notifies the administrator responsible for dealing with the abnormal event.

For example, when the log events of the gateway show that the temperature of the temperature and humidity sensor exceeds a set threshold, an alarm program is started and the administrator responsible for dealing with the abnormal event configured by the user management module 107 is notified. Wherein, a notification way is not limited to an email or a text message. In addition, the form of the alarm program is not limited to sound and light, phone calls, text messages, text, and so on.

Further, the data processing system 10 further includes:

The predicting module 109 performs data analysis based on the acquired sensing data of the target device and performs predictive maintenance on the target device based on an analysis result.

For example, the life of a cylinder is 50,000 hours, through analyzing a friction parameter of the cylinder, the life of the cylinder is adjusted to 45,000 hours when the friction force is strong.

The remote management module 110 performs a remote network detection, a configuration file distribution, and a file downloading on the target device.

Specifically, when the target device is required to enable or disable a specific service, the configuration file is delivered to the target device through the remote management module 110.

In the embodiment, by creating the device template, software development time is quickly shortened, and the sharing of the sensing data is improved. In addition, predictive maintenance and timely warning can be achieved by analyzing the log events.

Figure 3:
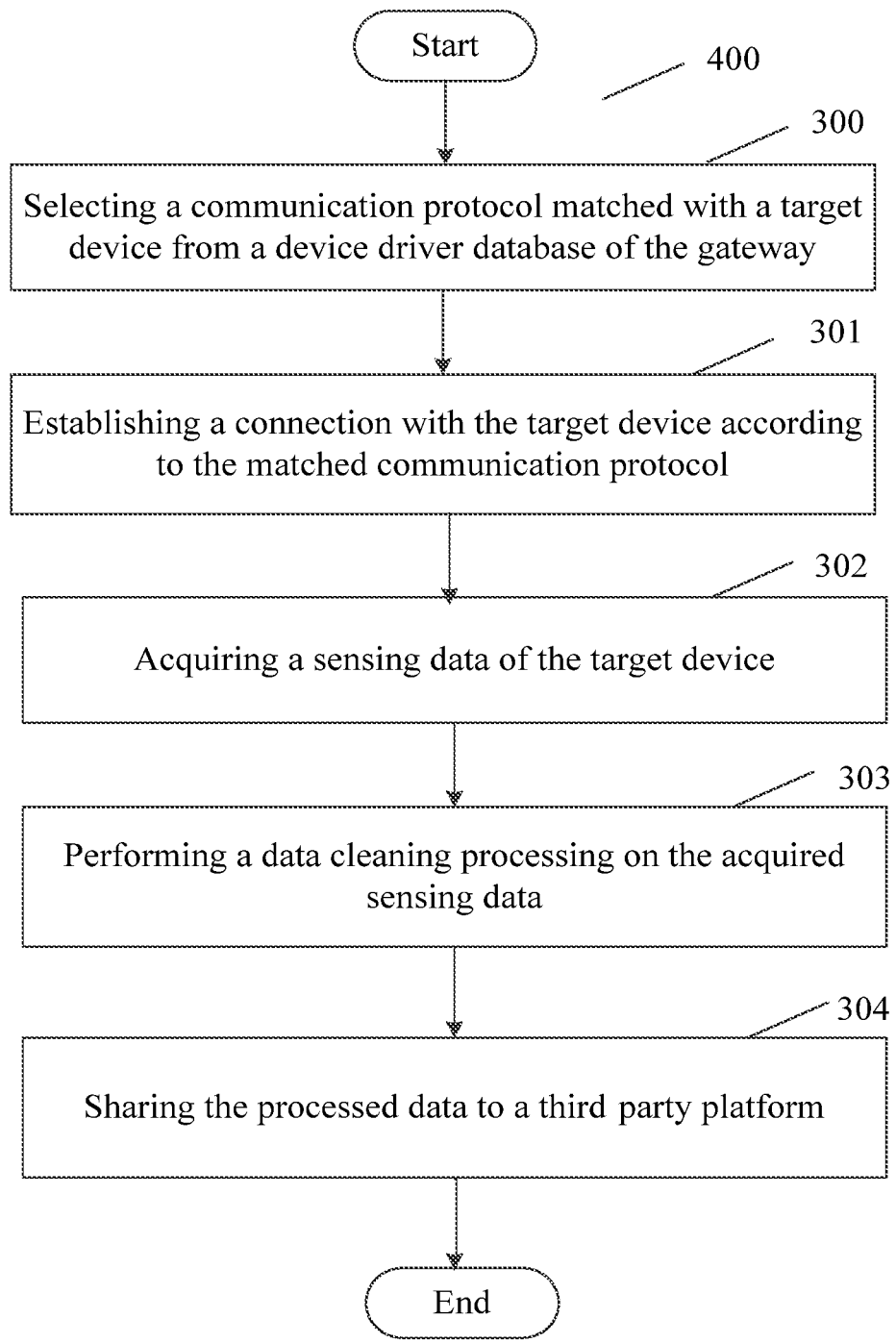
FIG. 3 is a flowchart in accordance with an embodiment of a method for data processing.

Referring to FIG. 3, a flowchart is presented in accordance with an embodiment of a method 400 for data processing, applied in a data processing system 10, and the function modules 101-110 as FIG. 2 illustrates are executed by the processor 30. Each block shown in FIG. 3 represents one or more processes, methods, or subroutines, carried out in the exemplary method 400. Additionally, the illustrated order of blocks is by example only and the order of the blocks can be changed. The method 400 can begin at block 300.

At block 300, selecting a communication protocol matched with a target device from a device driver database of the gateway 1.

In the embodiment, when an industrial device establishes a connection with the gateway, different communication protocols are used according to different device kinds, for example, Modbus communication protocol, serial communication protocol, TCP/IP protocol, MQTT protocol, and so on. The gateway 1 also includes the device driver database (not shown in the figures). The device driver database of the gateway 1 stores multiple fields and communication protocols that may be used by multiple kinds of devices. When the target device needs to establish a connection, the gateway 1 selects the communication protocol matched with the target device from the device driver database of the gateway 1.

At block 301, establishing a connection with the target device according to the matched communication protocol.

In the embodiment, the gateway 1 establishes the connection with the target device according to the matched communication protocol.

In a preferred embodiment, all devices connected to the gateway 1 are called sub-devices, and the gateway 1 also displays all sub-devices and sub-device information of the gateway 1 in the form of a list. When the target device is not in the sub-device list, the gateway 1 also adds a new sub-device in the sub-device list. In addition, according to an actual requirement, the gateway 1 deletes sub-devices in the sub-device list or modifies the sub-device information.

At block 302, acquiring a sensing data of the target device after establishing the connection with the target device.

Specifically, the device driver database provides the gateway 1 with a device template for extracting the sensing data of the target device. Through the device template of the device driver database, the gateway 1 obtains the type of the sensing data of the target device.

In the process of acquires the sensing data of the target device, the gateway 1 searches for the device template corresponding to the target device in the device driver database, then invokes the device template corresponding to the target device to acquire the finally sensing data of the target device.

The gateway 1 further performs a feature extraction on the sensing data of the target device when the device template corresponding to the target device does not exist in the device driver database of the gateway 1, adds the device template corresponding to the target device according to a pre-defined business requirement and the extracted features and stores the device template in the device driver database of the gateway 1. Business requirements are pre-defined by developers or managers based on actual production or life requirements.

Furthermore the gateway 1 also modifies or deletes the device template corresponding to the target device when the business requirements change.

For example, the device driver database of the gateway 1 stores the templates for the existing industrial devices to acquire the sensing data. For example, an electric meter needs to collect data such as current and voltage, and an SMT device needs to collect the component model, missing part information, and the position of each component on the PCB board, and so on. When the data of the SMT device is required to be collected, the device template of the SMT device in the device driver database stored in the gateway is called to invoke the component model, missing part information, and the location of each component on the PCB board.

When a new industrial device is connected, such as a temperature and humidity sensor, and the device template of the temperature and humidity sensor does not exist in the device driver database of the gateway, and the gateway 1 performs feature extraction on the data of the temperature and humidity sensor, for example, temperature, humidity, time and other information. When only the temperature and humidity information are required to be collected in the business requirement information, the gateway 1 adds a template for the temperature and humidity sensor based on the business requirement and the extracted feature data, and stores the template in the device driver database, so that when the sensing data of the temperature and humidity sensor needed is required to be collected next time, the gateway 1 can directly invoke the corresponding device template.

In addition, when the business requirements change, for example, in addition to temperature and humidity, it is necessary to obtain the temperature and humidity acquiring time of the temperature and humidity sensor, therefore the gateway 1 also needs to modify the device template corresponding to the temperature and humidity sensor according to the changed requirements, and use the changed template to replace the old template. When the data of the temperature and humidity sensor is not required to be collected, in order to save storage space, the gateway 1 also deletes the device template corresponding to the temperature and humidity sensor.

At block 303, performing a data cleaning processing on the acquired sensing data.

The gateway 1 obtains a data forwarding requirement of the third-party platform and cleans the original sensing data obtained from the industrial device as needed, and converts the original sensing data into data that can be recognized by the third-party platform. As an example, the voltage obtained from the electric meter is binary data. When required to be forwarded to a server, a cloud platform, or a monitoring platform, the binary data is converted into hexadecimal data through data cleaning. Of course, the cleaning method for different data is not limited to this and will not be repeated in the embodiment.

At block 304, sharing the processed data to a third-party platform.

Further, the method further includes:

The gateway 1 configures a network address, a system parameter, and a kernel parameter of the gateway.

Specifically, the system parameter includes basic information such as the model, location, and the number of access devices of the gateway, and the kernel parameter includes system information such as memory and network hard drives. The gateway 1 is also used to restart the gateway and restore factory settings.

The gateway 1 manages a user account, assigns a user operation permission, and configures an administrator responsible for dealing with an abnormal event.

Wherein, managing the user account management includes creating users, deleting users, and so on.

The gateway 1 records and analyzes log events during operation of the gateway, and when the abnormal event occurs in the log events, starts an alarm program and notifies the administrator responsible for dealing with the abnormal event.

For example, when the log events of the gateway show that the temperature of the temperature and humidity sensor exceeds a set threshold, an alarm program is started and the administrator responsible for dealing with the abnormal event configured by the gateway 1 is notified. Wherein, a notification way is not limited to an email or a text message. In addition, the form of the alarm program is not limited to sound and light, phone calls, text messages, text, and so on.

Further, the method further includes:

The gateway 1 performs data analysis based on the acquired sensing data of the target device and performs predictive maintenance on the target device based on an analysis result.

For example, the life of a cylinder is 50,000 hours, through analyzing a friction parameter of the cylinder, the life of the cylinder is adjusted to 45,000 hours when the friction force is strong.

The gateway 1 performs a remote network detection, a configuration file distribution, and a file downloading on the target device.

Specifically, when the target device is required to enable or disable a specific service, the configuration file is delivered to the target device through the gateway 1.

In the embodiment, by creating the device template, software development time is quickly shortened, and the sharing of the sensing data is improved. In addition, predictive maintenance and timely warning can be achieved by analyzing the log events.

The embodiments shown and described above are only examples. Many details are often found in the art such as the other features of a method for data processing. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for data processing, executed in a gateway, the method comprising:
    selecting a communication protocol matched with a target device from a device driver database of the gateway;
    establishing a connection with the target device according to the matched communication protocol;
    acquiring a sensing data of the target device, comprising:
        searching for a device template corresponding to the target device in the device driver database of the gateway, and calling the device template corresponding to the target device to obtain the sensing data of the target device when the device template corresponding to the target device exists in the device driver database of the gateway, wherein the device driver database stores a device template corresponding to a surface-mount technology (SMT) device, and the gateway calls the device template corresponding to the SMT device to collect a component model, missing part information, and a position of each component on a printed circuit board (PCB) board;
    performing a data cleaning processing on the sensing data, wherein the sensing data comprises a voltage obtained from an electric meter, the voltage is binary data, and the gateway converts the voltage from binary data into hexadecimal data in the data cleaning processing; and
    sharing the processed data to a third-party platform.

2. The method as claimed in claim 1, the method further comprising:
    configuring a network address, a system parameter, and a kernel parameter of the gateway, wherein the system parameter comprises a model, a location, and a number of access devices of the gateway, and the kernel parameter comprises memory and network hard drives;
    restarting the gateway and restoring factory settings of the gateway; and
    managing a user account, assigning a user operation permission, and configuring an administrator responsible for dealing with an abnormal event.

3. The method as claimed in claim 2, the method further comprising:
    recording and analyzing log events during operation of the gateway, and when an abnormal event occurs in the log events, starting an alarm program and notifying the administrator responsible for dealing with the abnormal event.

4. The method as claimed in claim 1, the method further comprising:
    performing a feature extraction on the sensing data of the target device, when the device template corresponding to the target device does not exist in the device driver database of the gateway; and adding the device template corresponding to the target device according to a pre-defined business requirement and the extracted feature.

5. The method as claimed in claim 4, the method further comprising:
modifying or deleting the device template corresponding to the target device, when the business requirement changes.

6. The method as claimed in claim 1, the method further comprising:
performing data analysis based on the sensing data of the target device, and performing a predictive maintenance on the target device based on an analysis result.

7. The method as claimed in claim 1, the method further comprising:
performing a remote network detection, a configuration file distribution, and a file downloading on the target device.

8. A gateway, the gateway comprising:
at least one processor;
a storage unit; and
one or more programs that are stored in the storage unit and executed by the at least one processor, the one or more programs comprising instructions for:
selecting a communication protocol matched with a target device from a device driver database of the gateway;
establishing a connection with the target device according to the matched communication protocol;
acquiring a sensing data of the target device, comprising:
searching for a device template corresponding to the target device in the device driver database of the gateway, and calling the device template corresponding to the target device to obtain the sensing data of the target device when the device template corresponding to the target device exists in the device driver database of the gateway, wherein the device driver database stores a device template corresponding to a surface-mount technology (SMT) device, and the device template corresponding to the SMT device is called to collect a component model, missing part information, and a position of each component on a printed circuit board (PCB) board;
performing a data cleaning processing on the sensing data, wherein the sensing data comprises a voltage obtained from an electric meter, the voltage is binary data, and performing the data cleaning processing on the sensing data comprises converting the voltage from binary data into hexadecimal data; and
sharing the processed data to a third-party platform.

9. The gateway as claimed in claim 8, the one or more programs further comprising instructions for:
configuring a network address, a system parameter, and a kernel parameter of the gateway, wherein the system parameter comprises a model, a location, and a number of access devices of the gateway, and the kernel parameter comprises memory and network hard drives;
restarting the gateway and restoring factory settings of the gateway; and
managing a user account, assigning a user operation permission, and configuring an administrator responsible for dealing with an abnormal event.

10. The gateway as claimed in claim 9, the one or more programs further comprising instructions for:
recording and analyzing log events during operation of the gateway, and when an abnormal event occurs in the log events, starting an alarm program and notifying the administrator responsible for dealing with the abnormal event.

11. The gateway as claimed in claim 8, the one or more programs further comprising instructions for:
performing a feature extraction on the sensing data of the target device, when the device template corresponding to the target device does not exist in the device driver database of the gateway; and
according to a pre-defined business requirement and the extracted feature, adding the device template corresponding to the target device.

12. The gateway as claimed in claim 11, the one or more programs further comprising instructions for:
modifying or deleting the device template corresponding to the target device, when the business requirement changes.

13. The gateway as claimed in claim 8, the one or more programs further comprising instructions for:
performing data analysis based on the sensing data of the target device, and performing a predictive maintenance on the target device based on an analysis result.

14. The gateway as claimed in claim 8, the one or more programs further comprising instructions for:
performing a remote network detection, a configuration file distribution, and a file downloading on the target device.

15. A non-transitory computer-readable storage medium in which computer programs are stored, and the computer programs can be executed by at least one processor, to enforce following steps:
selecting a communication protocol matched with a target device from a device driver database of a gateway;
establishing a connection with the target device according to the matched communication protocol;
acquiring a sensing data of the target device, comprising:
searching for a device template corresponding to the target device in the device driver database of the gateway, and calling the device template corresponding to the target device to obtain the sensing data of the target device when the device template corresponding to the target device exists in the device driver database of the gateway, wherein the device driver database stores a device template corresponding to a surface-mount technology (SMT) device, and the device template corresponding to the SMT device is called to collect a component model, missing part information, and a position of each component on a printed circuit board (PCB) board;
performing a data cleaning processing on the sensing data, wherein the sensing data comprises a voltage obtained from an electric meter, the voltage is binary data, and performing the data cleaning processing on the sensing data comprises converting the voltage from binary data into hexadecimal data; and
sharing the processed data to a third-party platform.

16. The non-transitory computer-readable storage medium as claimed in claim 15, the computer programs can be executed by at least one processor, to further enforce following steps:
configuring a network address, a system parameter, and a kernel parameter of the gateway, wherein the system parameter comprises a model, a location, and a number of access devices of the gateway, and the kernel parameter comprises memory and network hard drives;
restarting the gateway and restoring factory settings of the gateway; and managing a user account, assigning a user operation permission, and configuring an administrator responsible for dealing with an abnormal event.

17. The non-transitory computer-readable storage medium as claimed in claim 16, the computer programs can be executed by at least one processor, to further enforce following steps:

recording and analyzing log events during operation of the gateway, and when an abnormal event occurs in the log events, starting an alarm program and notifying the administrator responsible for dealing with the abnormal event.

\* \* \* \* \*